US009117241B2

(12) United States Patent
Yamahara

(10) Patent No.: US 9,117,241 B2
(45) Date of Patent: Aug. 25, 2015

(54) INPUT NUMERICAL VALUE DISPLAY DEVICE, INPUT NUMERICAL VALUE DISPLAY PROGRAM, SERVER APPARATUS FOR INPUT NUMERICAL VALUE DISPLAY, INPUT NUMERICAL VALUE DISPLAY METHOD, AND RECORDING MEDIUM WHICH RECORDS INPUT NUMERICAL DISPLAY PROGRAM

(75) Inventor: Hisanori Yamahara, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 160 days.

(21) Appl. No.: 13/510,067

(22) PCT Filed: Nov. 29, 2010

(86) PCT No.: PCT/JP2010/071236
§ 371 (c)(1),
(2), (4) Date: May 16, 2012

(87) PCT Pub. No.: WO2011/065525
PCT Pub. Date: Jun. 3, 2011

(65) Prior Publication Data
US 2012/0229472 A1 Sep. 13, 2012

(30) Foreign Application Priority Data

Nov. 30, 2009 (JP) ................................. 2009-272781

(51) Int. Cl.
*G06T 11/00* (2006.01)
*G06Q 30/08* (2012.01)
(Continued)

(52) U.S. Cl.
CPC ................ *G06Q 30/08* (2013.01); *G06F 3/018* (2013.01); *G06F 3/0233* (2013.01); *G06F 3/04847* (2013.01); *G06F 17/2217* (2013.01); *G06F 17/2223* (2013.01)

(58) Field of Classification Search
CPC ..... G06F 3/023; G06F 17/22; G06F 3/04886; G06F 3/04847; G06F 3/018; G06F 3/147; G06F 3/048; G06F 17/21; G06F 17/2217; G06F 17/2223; G06F 3/02; G06F 17/24; G06Q 50/00; G06Q 30/06; G06Q 30/08; G06Q 40/02
USPC ......... 345/467, 468, 469, 156, 171, 173, 168, 345/169, 551; 341/22; 714/46
See application file for complete search history.

(56) References Cited

U.S. PATENT DOCUMENTS

| 4,749,982 | A | * | 6/1988 | Rikuna et al. .............. 340/146.2 |
| 2002/0041261 | A1 | * | 4/2002 | Lee .................................. 345/27 |

(Continued)

FOREIGN PATENT DOCUMENTS

| CN | 2546951 Y | 1/2002 |
| JP | 57111649 A | 7/1983 |

(Continued)

OTHER PUBLICATIONS

Japanese Office Action dated Mar. 12, 2013, issued in Japanese Patent Application No. 2009-272781.

(Continued)

*Primary Examiner* — Jason M Repko
*Assistant Examiner* — Michael Le
(74) *Attorney, Agent, or Firm* — Sughrue Mion, PLLC

(57) ABSTRACT

An inputter can intuitively understand a numerical value input by himself/herself and the possibility of ignoring an erroneous input can be reduced. Only an Arabic numeral representing the input numerical value is displayed in a first display area. At least one of (i) a character string comprising an Arabic numeral and a character or a character string other than the Arabic numeral and (ii) only a character or a character string other than the Arabic numeral, which represents the input numerical value, is displayed in a second display area.

13 Claims, 9 Drawing Sheets

(51) Int. Cl.
*G06F 3/01* (2006.01)
*G06F 3/023* (2006.01)
*G06F 3/0484* (2013.01)
*G06F 17/22* (2006.01)

(56) References Cited

U.S. PATENT DOCUMENTS

2006/0095843 A1* 5/2006 Chou .......................... 715/535
2006/0128327 A1* 6/2006 Kunita ....................... 455/151.2
2008/0150768 A1* 6/2008 Lei et al. ........................ 341/28

FOREIGN PATENT DOCUMENTS

| JP | 64-078367 | * | 3/1989 |
| JP | 64-078367 | A | 3/1989 |
| JP | 04369074 | A | 12/1992 |
| JP | 2001-352252 | | 11/2001 |
| JP | 2002-203143 | A | 7/2002 |
| JP | 2002203143 | A * | 7/2002 |
| JP | 2004206359 | A | 7/2004 |
| JP | 2008-242817 | | 10/2008 |

OTHER PUBLICATIONS

Japanese Office Action dated Jun. 18, 2013, issued in Japanese Patent Application No. 2009-272781.
"The foundation of the Windows foundation learned from structure," Nikkei Business Publications, Inc., Oct. 30, 1999.
Korean Office Action dated Jul. 31, 2013, issued in Korean Patent Application No. 10-2012-7013524.
International Search Report of PCT/JP2010/071236 dated Feb. 1, 2011.
"The process for inputting a transfer amount of money on the website of a bank", cited in the Korean Office Action dated Jun. 24, 2014 issued in corresponding Korean Patent Application No. 10-2012-7013524.

* cited by examiner

FIG.5

EXHIBITED PRODUCT INFORMATION

| |
|---|
| AUCTION ID |
| CATALOG ID |
| PRODUCT NAME |
| THE NUMBER OF EXHIBITED PRODUCT |
| GENRE INFORMATION |
| PRODUCT CONDITION |
| PRODUCT DESCRIPTION |
| START PRICE |
| IMMEDIATE SUCCESSFUL BID PRICE |
| MINIMUM BID PRICE |
| AUCTION START DATE AND TIME |
| AUCTION END DATE AND TIME |
| IMAGE URL |
| THE NUMBER OF BID |
| CURRENT PRICE |
| HIGHEST BID TENDERING BIDDER MEMBER ID |
| HIGHEST BID TENDERING BIDDER NICKNAME |
| PURCHASE STORE NAME |
| PURCHASE STORE ID |
| ⋮ |

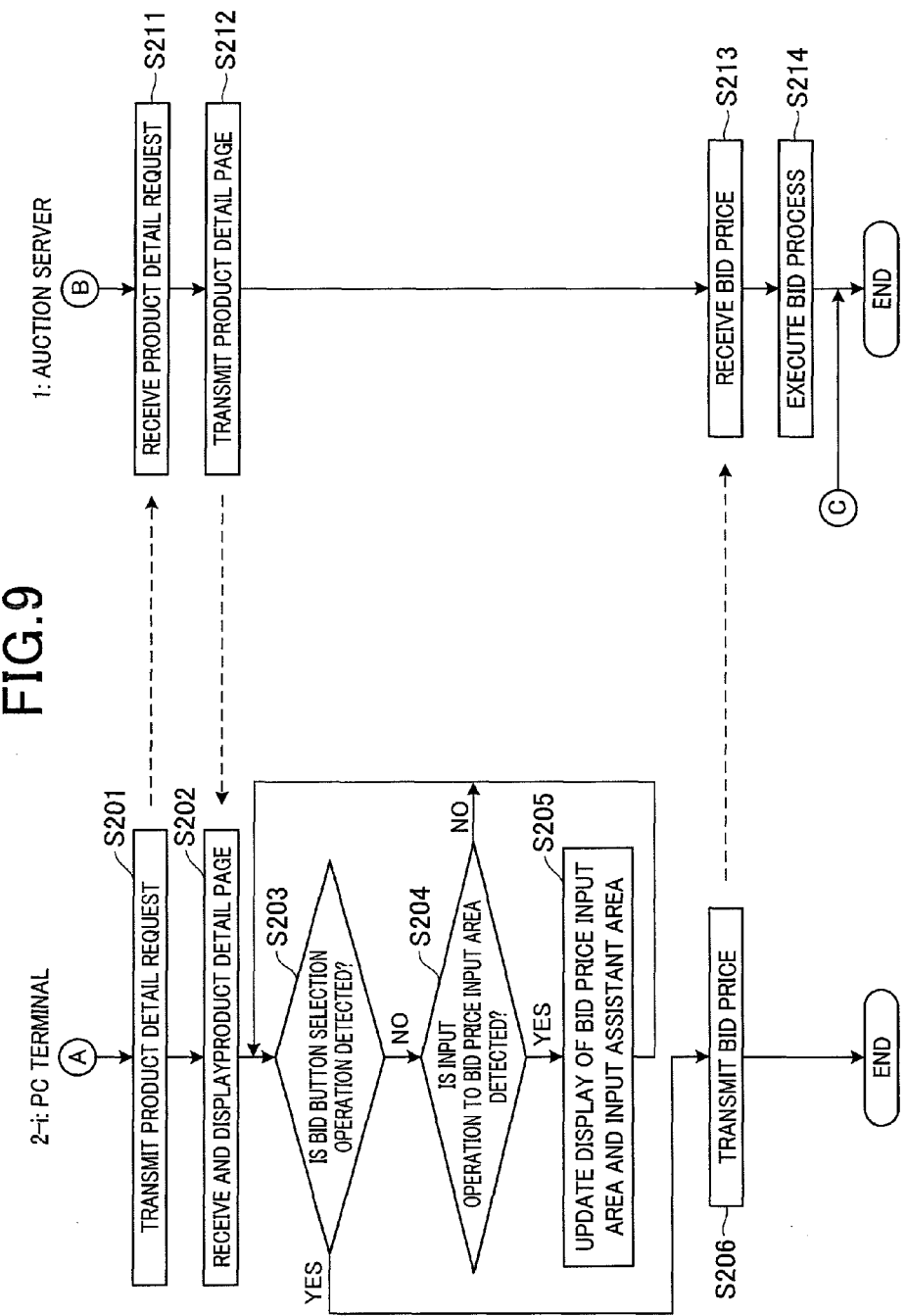

INPUT NUMERICAL VALUE DISPLAY DEVICE, INPUT NUMERICAL VALUE DISPLAY PROGRAM, SERVER APPARATUS FOR INPUT NUMERICAL VALUE DISPLAY, INPUT NUMERICAL VALUE DISPLAY METHOD, AND RECORDING MEDIUM WHICH RECORDS INPUT NUMERICAL DISPLAY PROGRAM

CROSS REFERENCE TO RELATED APPLICATIONS

This application is a National Stage of International Application No. PCT/JP2010/071236 filed Nov. 29, 2010, claiming priority based on Japanese Patent Application No. 2009-272781 filed Nov. 30, 2009, the contents of all of which are incorporated herein by reference in their entirety.

TECHNICAL FIELD

The present invention relates to an input numerical value display device that is used when a user inputs numerical values, an input numerical value display program, a server apparatus for input numerical value display, and an input numerical value display method.

BACKGROUND ART

In the related art, an erroneous input of a numerical value such as a price or a numerical quantity in electronic trading causes problems. For example, there is the problem that a bidder erroneously inputs a price more than an originally intended price as a bid price in a net auction (online auction), or that a retailer erroneously inputs an order amount (the number of the ordered products) more than an originally intended order amount as an order amount at the time of ordering products from a wholesaler. Besides the electronic trading, there are many chances of inputting numerical values to an information processing device in information processing society. For this reason, in many cases, an erroneous numerical value input causes big economic loss and credit loss.

In order to resolve the above problem, Patent Document 1 (paragraphs [0048] to [0053], and FIG. 7) describes a technology for multiplying an input value of an "amount of money" by an input value of a "numerical quantity" and giving an inputter warning of the possibility of a numerical value being erroneously input, when the calculation result is more than a predetermined limitation value.

CITATION LIST

Patent Document

Patent Document 1: Japanese Patent Application Laid-Open No. 2002-203143

SUMMARY OF THE INVENTION

Problem to be Solved by the Invention

According to the technology that is described in Patent Document 1, when the "amount of money" or the "numerical quantity" by which the calculation result is more than the predetermined limitation value is input, the warning is given. However, when the "amount of money" or the "numerical quantity" is erroneously input in a range of the limitation value, the warning is not given and the erroneous input may not be discovered.

The present invention has been made in view of the above problems and it is an object of the present invention to provide an input numerical value display device, an input numerical value display program, a server apparatus for input numerical value display, an input numerical value display method, and a recording medium which records an input numerical value display program, in which an inputter can intuitively understand a numerical value input by himself/herself and the possibility of ignoring an erroneous input can be reduced.

Means for Solving the Problem

In order to achieve the above object, an input numerical value display device described in claim 1 includes an acquiring means that receives an input of a numerical value and acquires the input numerical value, a first display control means that causes to display an Arabic numeral representing the input numerical value in a first display area, a generating means that generates numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on numerical value information of the input numerical value, and a second display control means that causes to display either the character or the character string indicated by the numerical-value-representing-character-information in a second display area.

By this configuration, the numerical value that is input by an input operation from a user is displayed by the Arabic numeral in the first display area and is displayed by at least any one of (i) the character string comprising the Arabic numeral and the character or the character string other than the Arabic numeral and (ii) only the character or only the character string other than the Arabic numeral in the second display area.

Therefore, according to the invention described in claim 1, the user who performs the input operation can intuitively understand the input numerical value from at least any one of the display of (i) the character string comprising the Arabic numeral and the character or the character string other than the Arabic numeral and the display of (ii) only the character or only the character string other than the Arabic numeral in the second display area, in addition to the display of the Arabic numeral in the first display area. As a result, the possibility of ignoring an erroneous input can be reduced.

According to the input numerical value display device described in claim 2, in the input numerical value display device described in claim 1, when the generating means generates the numerical-value-representing-character-information indicating the character string comprising the Arabic numeral and either the character or the character string other than the Arabic numeral, based on the numerical value informational of the input numerical value, the generating means generates the numerical-value-representing-character-information indicating the character string comprising the Arabic numeral indicating a value of at least any digit position in the input numerical value and either the character or the character string other than the Arabic numeral, said either the character or the character string other than the Arabic numeral indicating the digit position in the input numerical value, based on the numerical value information of the input numerical value According to the invention described in claim 2, the user can intuitively understand the input numerical value from the combination of the digit position indicated by the character or the character string other than the Arabic numeral and the Arabic numeral indicating the value of the digit position. For example, when the user inputs the numerical values having many digits, the user can understand the input numerical value based on the digit position indicated by the character or the character string other than the Arabic numeral. As a result, an erroneous input of digits (number of digits) can be prevented in advance. Specifically, the input numerical value such as "35万" is displayed using "万" or "億" (indicating the digit position) of Japanese as the character or the character string other than the Arabic numeral, or the input numerical value such as "35 million" is displayed using "thousand" or "million" (indicating the digit position) of English as the character or the character string other than the Arabic numeral, thus the erroneous input of digits can be prevented in advance.

According to the input numerical value display device described in claim 3, in the input numerical value display device described in claim 2, the input numerical value display device further includes a language setting means that detects a use language of a user and sets the use language as a language used by the generating means for generating, the generating means uses either the character or the character string indicating the digit position represented by the set use language as either the character or the character string indicating the digit position.

According to the invention described in claim 3, the user selects the language (for example, a native language) which can be understood by himself/herself as the use language, as a result, it is possible that the digit position indicated by the character or the character string other than the Arabic numeral, is displayed using the selected language. Therefore, the possibility of the user misunderstanding the numerical value displayed in the second display area can be reduced and the possibility of erroneously inputting the numerical value can be reduced.

According to the input numerical value display device described in claim 4, in the input numerical value display device described in claim 3, when Japanese is set as the use language, the generating means uses a Chinese character (kanji) indicating the digit position as either the character or the character string indicating the digit position.

According to the invention described in claim 4, the user who can understand Japanese, selects Japanese as the use language, as a result, it is possible that the digit position indicated by the character or the character string other than the Arabic numeral, is displayed using a Chinese character. Therefore, the possibility of the user who can understand Japanese misunderstanding the numerical value displayed in the second display area can be reduced and the possibility of erroneously inputting the numerical value can be reduced.

According to the input numerical value display device described in claim 5, in the input numerical value display device described in claim 1, the input numerical value display device further includes a language setting means that detects a use language of a user and sets the use language as a language used by the generating means for generating, and when the generating means generates the numerical-value-representing-character-information indicating the either character or the character string represented by either only the character or only the character string other than an Arabic numeral, based on the numerical value informational of the input numerical value, the generating means generates the numerical-value-representing-character-information indicating either the character or the character string represented by either only the character or only the character string other than an Arabic numeral, said either the character or the character string other than an Arabic numeral indicating the input numerical value by the set use language, based on the numerical value information of the input numerical value.

According to the invention described in claim 5, the user selects the language (for example, a native language) which can be understood by himself/herself as the use language, as a result, it is possible that the character or the character string other than the Arabic numeral, is displayed using the selected language in the second display area. Therefore, the possibility of the user misunderstanding the numerical value displayed in the second display area can be reduced and the possibility of erroneously inputting the numerical value can be reduced.

According to the input numerical value display device described in claim 6, in the input numerical value display device described in claim 5, when Japanese is set as the use language, the generating means uses either the character or the character string represented by a Chinese character as either the character or the character string indicating the input numerical value.

According to the invention described in claim 6, the user who can understand Japanese, selects Japanese as the use language, as a result, it is possible that the character or the character string other than the Arabic numeral, is displayed using a Chinese character in the second display area. Therefore, the possibility of the user who can understand Japanese misunderstanding the numerical value displayed in the second display area can be reduced and the possibility of erroneously inputting the numerical value can be reduced.

According to the input numerical value display device described in claim 7, in the input numerical value display device described in anyone of claims 1 to 6, the numerical value indicates at least one of a price, number, and weight of a product.

According to the input numerical value display device described in claim 8, in the input numerical value display device described in any one of claims 1 to 7, the acquiring means, by detecting an operation to input the numerical value from the user, receives the input of the numerical value, and acquires the received numerical value.

An input numerical value display program described in claim 9 causes a computer to function as an acquiring means that receives an input of a numerical value and acquires the input numerical value, a first display control means that causes to display an Arabic numeral representing the input numerical value in a first display area, a generating means that generates numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on numerical value information of the input numerical value, and a second display control means that causes to display either the character or the character string indicated by the numerical-value-representing-character-information in a second display area.

According to the invention described in claim 9, similar to the invention described in claim 1, the user who performs the input operation can intuitively understand the input numerical value from at least any one of the display of (i) the character string comprising the Arabic numeral and the character or the character string other than the Arabic numeral and the display of (ii) only the character or only the character string other than the Arabic numeral in the second display area, in addition to the display of the Arabic numeral in the first display area. As a result, the possibility of ignoring an erroneous input can be reduced.

A server apparatus described in claim 10 is a server apparatus for input numerical value display, that is connected to an input numerical value display device through an electric communication network. The server apparatus causes the input numerical value display device to receive an input of a numerical value and acquire the input numerical value, to display an Arabic numeral representing the input numerical value in a first display area, to generate numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on numerical value information of the input numerical value, and to display the character or the character string indicated by the numerical-value-representing-character-information in a second display area.

A server apparatus described in claim 11 is a server apparatus for input numerical value display, that is connected to an input numerical value display device through an electric communication network, the input numerical value display device receiving an input of a numerical value and acquiring the input numerical value. The server apparatus includes a receiving means that receives numerical value information indicating the numerical value acquired by the input numerical value display device, from the input numerical value display device, a server generating means that numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on the numerical value indicated by the numerical value information, and a transmitting means that transmits the numerical-value-representing-character-information to the input numerical value display device, such that either the character or the character string indicated by the numerical-value-representing-character-information is displayed by the input numerical value display device.

According to the invention described in claim 11, similar to the invention described in claim 1, the user who performs the input operation in the input numerical value display device can intuitively understand the input numerical value from at least any one of the display of (i) the character string comprising the Arabic numeral and the character or the character string other than the Arabic numeral and the display of (ii) only the character or only the character string other than the Arabic numeral in the second display area, in addition to the display of the Arabic numeral in the first display area. As a result, the possibility of ignoring an erroneous input can be reduced.

An input numerical value display method described in claim 12 includes a step of causing a computer to acquire an input numerical value, a step of causing the computer to display an Arabic numeral representing the input numerical value in a first display area, a step of causing the computer to generate numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on numerical value information of the input numerical value, and a step of causing the computer to display either the character or the character string indicated by the numerical-value-representing-character-information in a second display area.

According to the invention described in claim 12, similar to the invention described in claim 1, the user who performs the input operation can intuitively understand the input numerical value from at least any one of the display of (i) the character string comprising the Arabic numeral and the character or the character string other than the Arabic numeral and the display of (ii) only the character or only the character string other than the Arabic numeral in the second display area, in addition to the display of the Arabic numeral in the first display area. As a result, the possibility of ignoring an erroneous input can be reduced.

An invention described in claim 13 is a recording medium which records an input numerical value display program, the input numerical value display program causing a computer to function as an acquiring means that receives an input of a numerical value and acquires the input numerical value, a first display control means that causes to display an Arabic numeral representing the input numerical value in a first display area, a generating means that generates numerical-value-representing-character-information indicating either a character or a character string, either the character or the character string representing the same value as the input numerical value, represented by at least any one of (i) the character string comprising an Arabic numeral and either the character or the character string other than the Arabic numeral and (ii) either only the character or only the character string other than an Arabic numeral, based on numerical value information of the input numerical value, and a second display control means that causes to display either the character or the character string indicated by the numerical-value-representing-character-information in a second display area.

Effect of the Invention

According to the present invention, the user who performs the input operation can intuitively understand the input numerical value from at least any one of the display of (i) the character string comprising the Arabic numeral and the character or the character string other than the Arabic numeral and the display of (ii) only the character or only the character string other than the Arabic numeral in the second display area, in addition to the display of the Arabic numeral in the first display area. As a result, the possibility of ignoring an erroneous input can be reduced.

BRIEF DESCRIPTION OF THE DRAWINGS

FIG. 5 is a diagram illustrating an example of contents that are set to exhibited product information.

FIG. 9 is a flowchart illustrating a processing example of the auction server and the PC terminal.

MODES FOR CARRYING OUT THE INVENTION

Hereinafter, an embodiment of the present invention will be described with reference to the drawings. The embodiment to be described below is an embodiment of the case where the present invention is applied to an auction system.

[1. Schematic Configuration and Function of the Auction System]

First, the schematic configuration and functions of an auction system S according to this embodiment will be described using FIG. 1.

Figure 1:
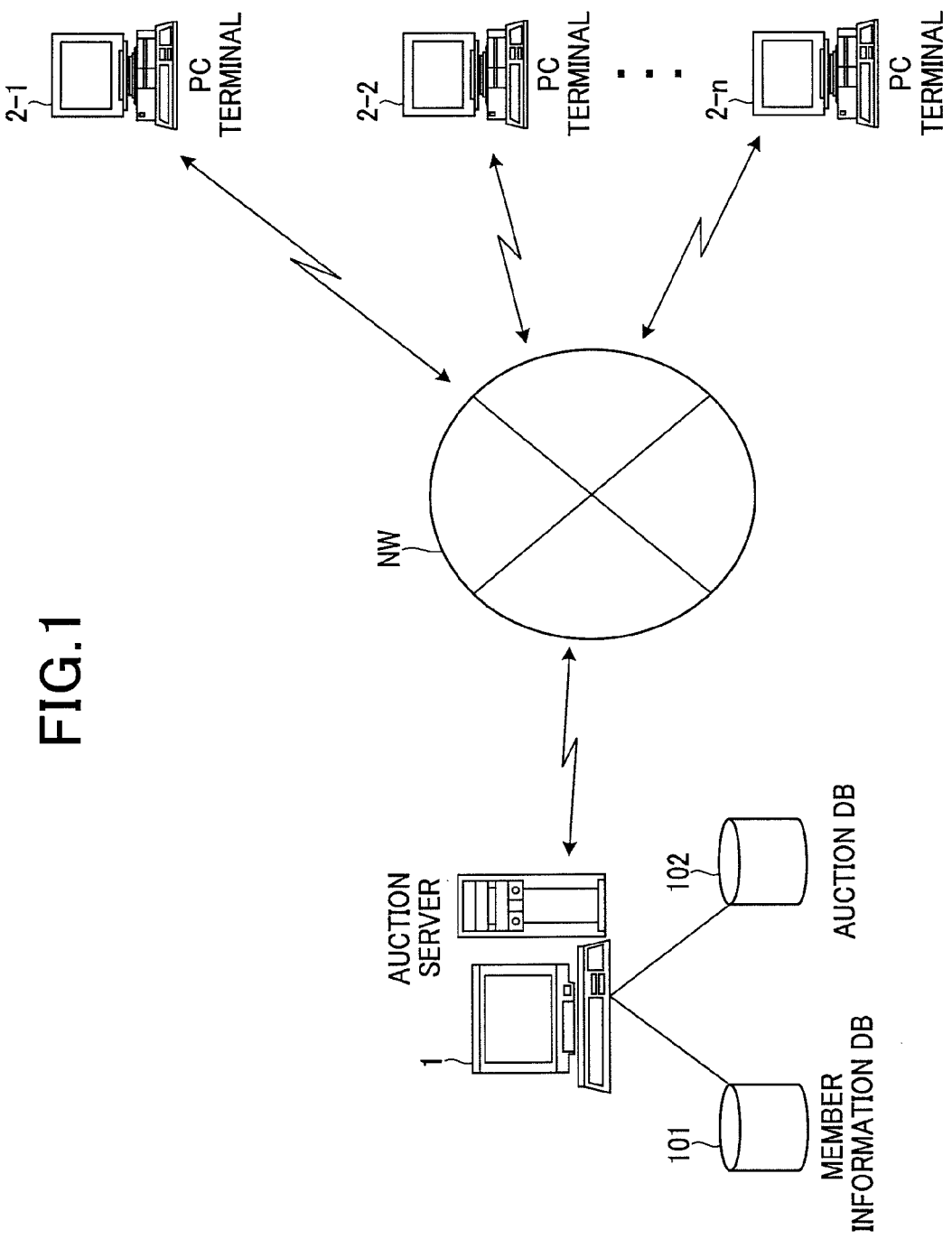
FIG. 1 is a diagram illustrating an example of the schematic configuration of an auction system.

FIG. 1 is a diagram illustrating an example of the schematic configuration of the auction system S according to this embodiment.

As illustrated in FIG. 1, the auction system S is configured to include an auction server 1 which is provided with a member database (DB) 101 and an auction DB 102, and plural PC terminals 2-$i$ ($i=1, 2, \ldots,$ and n).

The auction server 1 and the PC terminal 2-$i$ can exchange data with each other through a network NW, while using e.g. a TCP/IP and so on as a communication protocol. Incidentally, the network NW is constructed using, for example, the Internet, a dedicated communication line (for example, a community antenna television (CATV) line), a moving body communication network (including a base station and so on), a gateway, and so on.

In the auction system S that has the above-described configuration, for example, the auction server 1 is a server apparatus that is disposed to provide an auction service by a service provider who provides various services through the network NW.

A user who uses the PC terminal 2-$i$ executes a member registration procedure to use the services (hereinafter, a user who can use the services is called a "member"). A member ID is given to the user who becomes a member. The user can use the auction service using the member ID. Member information about the registered member is registered in the member information DB 101. Moreover, information about exhibited products (merchandise offered for sale) in the auction service, information about a bid, information about a successful bid and so on are registered in the auction DB 102.

The auction server 1 accesses the auction DB 102 or the member information database 101, in response to a request from the PC terminal 2-$i$, and executes a process to establish an auction between the users of the PC terminal 2-$i$.

The PC terminal 2-$i$ accesses the auction server 1 to acquire a Web page and displays the Web page on a screen. Thereby, the user can exhibit (offer for sale) or bid for the product, through the Web page. In this embodiment, a personal computer is applied as the PC terminal 2-$i$. However, the PC terminal 2-$i$ may be a terminal device, such as e.g. a personal digital assistant (PDA) and a set top box (STB).

Incidentally, in the PC terminal 2-$i$, a predetermined operating system, a Web browser application, and an e-mail application are installed.

[2. Configuration and Functions of the Auction Server]

Next, the configuration and the functions of the auction server 1 will be described using FIGS. 2 to 5.

Figure 2:
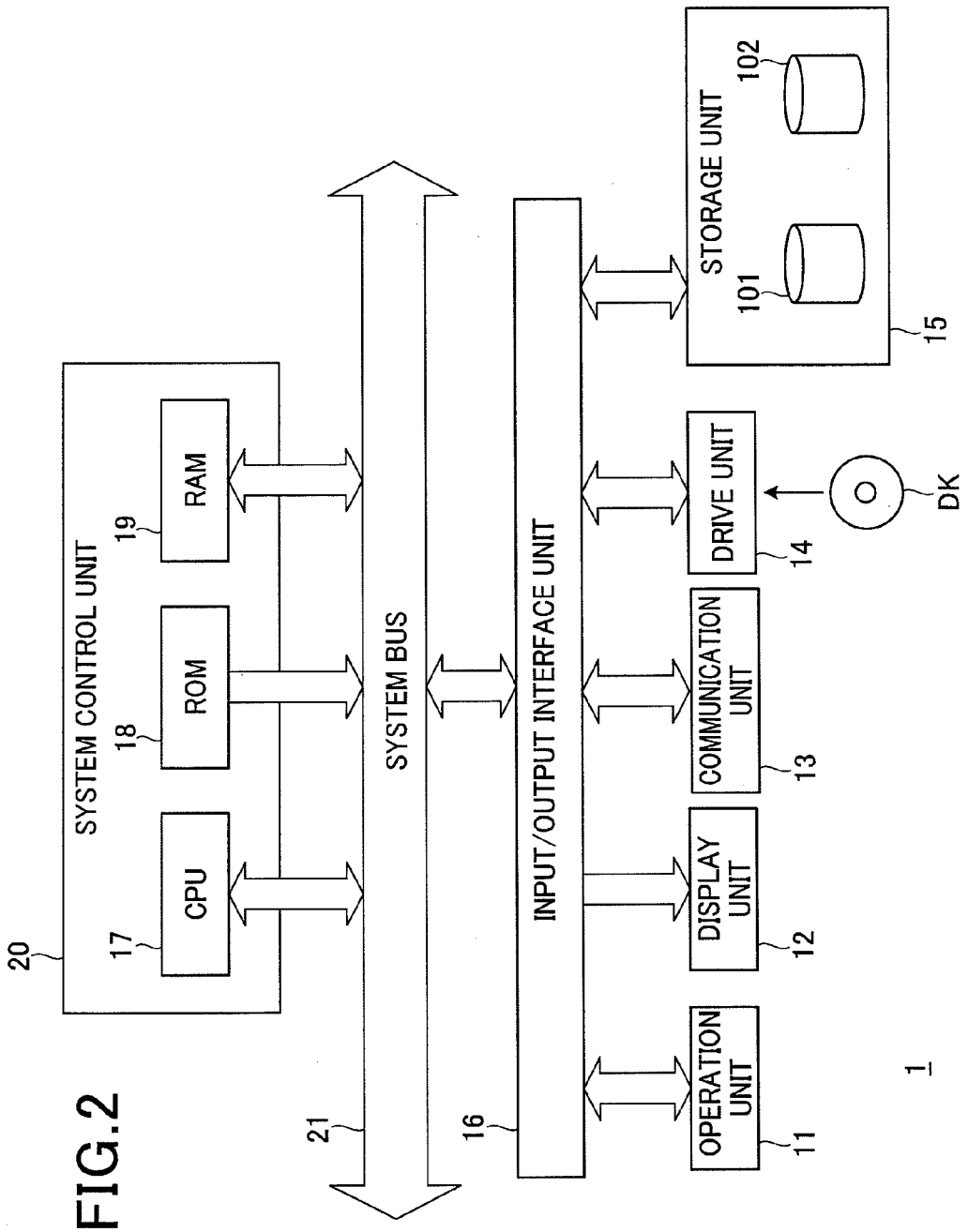
FIG. 2 is a block diagram illustrating an example of the schematic configuration of an auction server.

As illustrated in FIG. 2, the auction server 1 is provided with an operation unit 11, a display unit 12, a communication unit 13, a drive unit 14, a storage unit 15, an input/output interface unit 16, and a system control unit 20. The system control unit 20 and the input/output interface unit 16 are connected to each other through a system bus 21.

Incidentally, the auction server 1 may be a server system that is configured using plural servers such as a server to manage a database and a WWW server to provide various information.

The operation unit 11 is configured using e.g. a keyboard, a mouse, and so on and receives an operation instruction from an operator and outputs instruction contents as an instruction signal to the system control unit 20. The display unit 12 is configured using e.g. a cathode ray tube (CRT) display, a liquid crystal display and so on, and displays information such as a character or an image. The communication unit 13 is connected to the network NW and controls a communication state with another server apparatus, the PC terminal 2-$i$, and so on. The drive unit 14 reads data from the disk DK such as e.g. a flexible disk, a compact disk (CD), a digital versatile disk (DVD), and so on, and records the data in the disk DK. The storage unit 15 is configured using e.g. a hard disk drive and so on, and stores various programs and data. The input/output interface 16 executes an interface process between the operation unit 11 to the storage unit 15 and the system control unit 20. The system control unit 20 is configured using a central processing unit (CPU) 17, a read only memory (ROM) 18, and a random access memory (RAM) 19.

In the storage unit 15, the member information DB 101 and the auction DB 102 are constructed.

Figure 3:
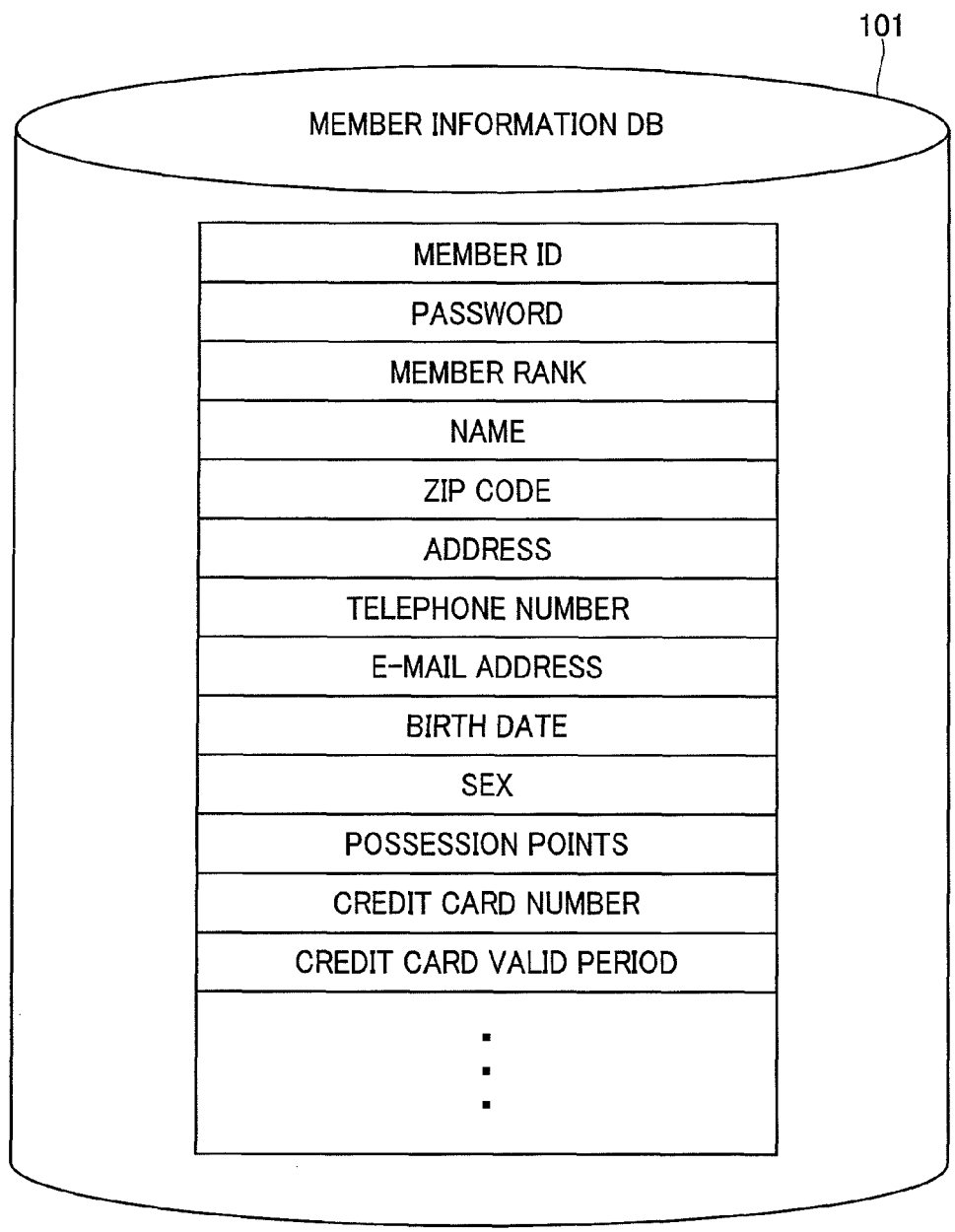
FIG. 3 is a diagram illustrating an example of contents of information that is registered in a member information DB.

As illustrated in FIG. 3, in the member information DB 101, member information about each member and the member ID to identify each member are associated with each other and are registered. Specifically, to the member information, for example, the member ID, a password to log in, a member rank, a name of the member, a zip code, an address, a telephone number, an e-mail address, a birth date, and a sex of a member, possession points of the member, a card number such as a credit card, a valid period of the credit card, and so on are set.

Figure 4:
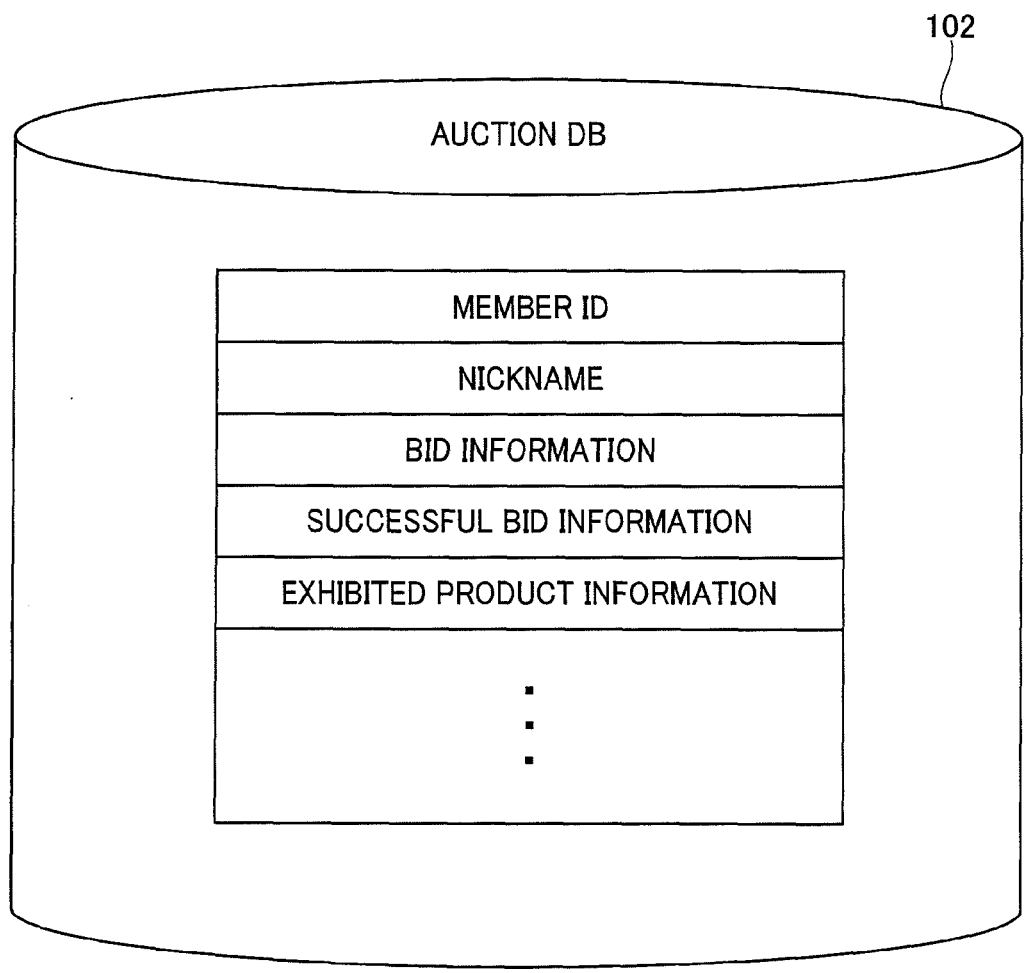
FIG. 4 is a diagram illustrating an example of contents of information that is registered in an auction DB.

As illustrated in FIG. 4, in the auction DB 102, information about the auction and the member ID of each member are associated with each other and are registered. For example, in the auction database 102, the member ID, a nickname of the member, bid information, successful biding information, exhibited product information, and so on are registered.

First, the bid information is information about bid by the members. The bid information is associated with an auction ID and is registered, for each bidden product. For example, to the bid information, the auction ID, a bid number given by bid, a bid date and time, the number of the bit, a bid price, and so on are set.

Next, the successful bid information is information of the products that are successfully bidden by the members. The successful bid information is associated with the auction ID and is registered, for each successfully bidden product. For example, to the successful bid information, the auction ID, the bid number, a successful bid date and time, the number of the successful bid, a successful bid price, and so on are set.

Next, the exhibited product information is information about the products that are exhibited by the members. The exhibited product information is associated with the auction ID to identify each auction and is registered, for each exhibited product. For example, to the exhibited product information, the auction ID, a catalog ID of catalog information of the exhibited product, a product name, the number of the exhibited product, genre information indicating a genre to which the exhibited product belongs, a product condition indicating a new product or a secondhand product, a product description, a start price, an immediate successful bid price, a minimum bid price, an auction start date and time, an action end date and time, an image URL indicating the registration destination of image data of the exhibited product, the number of the bid, a current price, the member ID of the member who tenders a highest bid, a nickname of the member, and so on are set, as illustrated in FIG. 5.

In the storage unit 15, HTML data constituting the Web page, image data, voice data, text data, and so on are stored. In the data, HTML data for a product detail page to display the product detail page including a bid area where the user inputs the bid price (referred to as a highest bid price) is included. In the HTML data for the product detail page, a scrip tag is described. By executing a script (an example of an "input numerical value display program") specified by the scrip tag in the PC terminal 2-*i*, an input assistance function of when the user inputs the bid price in the bid area of the product detail page is realized.

Furthermore, in the storage unit 15, in addition to the predetermined operating system, a world wide web (WWW) server program, a mail server program and a database management program are stored. The world wide web (WWW) server program is a program for that the auction server 1 generates the Web page based on the various data stored in the storage unit 15 using an hyper text transfer protocol (HTTP) protocol, in response to a request transmitted from the PC terminal 2-*i*, and transmits the Web page to the PC terminal 2-*i*. The mail server program is for a program that the auction server 1 receives an e-mail from another mail server, and transmits an e-mail generated by the auction server 1 to the other mail server using an simple mail transfer protocol (SMTP). The database management program is a program that the auction server 1 manages each database.

In addition, in the storage unit 15, a member information management program for managing the various information stored in the member information DB 101, an auction information management program for managing the various information registered in the auction DB 102, and an action processing program for executing a process related to an exhibited product, a bid, a successful bid, communication between an exhibitor and a successful bidder, and so on at the auction site are stored.

Incidentally, the various programs may be acquired from other server apparatus through the network NW or may be recorded in the disk DK such as the CD-ROM and be read through the drive unit 14.

The system control unit 20 controls the individual units of the auction server 1, when the CPU 17 reads the various programs stored in the ROM 18 or the storage unit 15 and executes the various programs using the RAM 19.

For example, the system control unit 20 receives the request that is transmitted from the PC terminal 2-*i* and transmits the HTML data to display the Web page according to the request. The system control unit 20 executes a login process or updates the information in the auction DB 102 based on the information transmitted from the PC terminal 2-*i*.

[3. Configuration and Function of the PC Terminal]

Next, the configuration and the functions of the PC terminal 2-*i* will be described using FIGS. 6 and 7. However, since the PC terminal 2-*i* has almost the same configuration as that of the auction server 1, redundant descriptions will be repeated and the difference with the auction server 1 will be mainly described.

Figure 6:
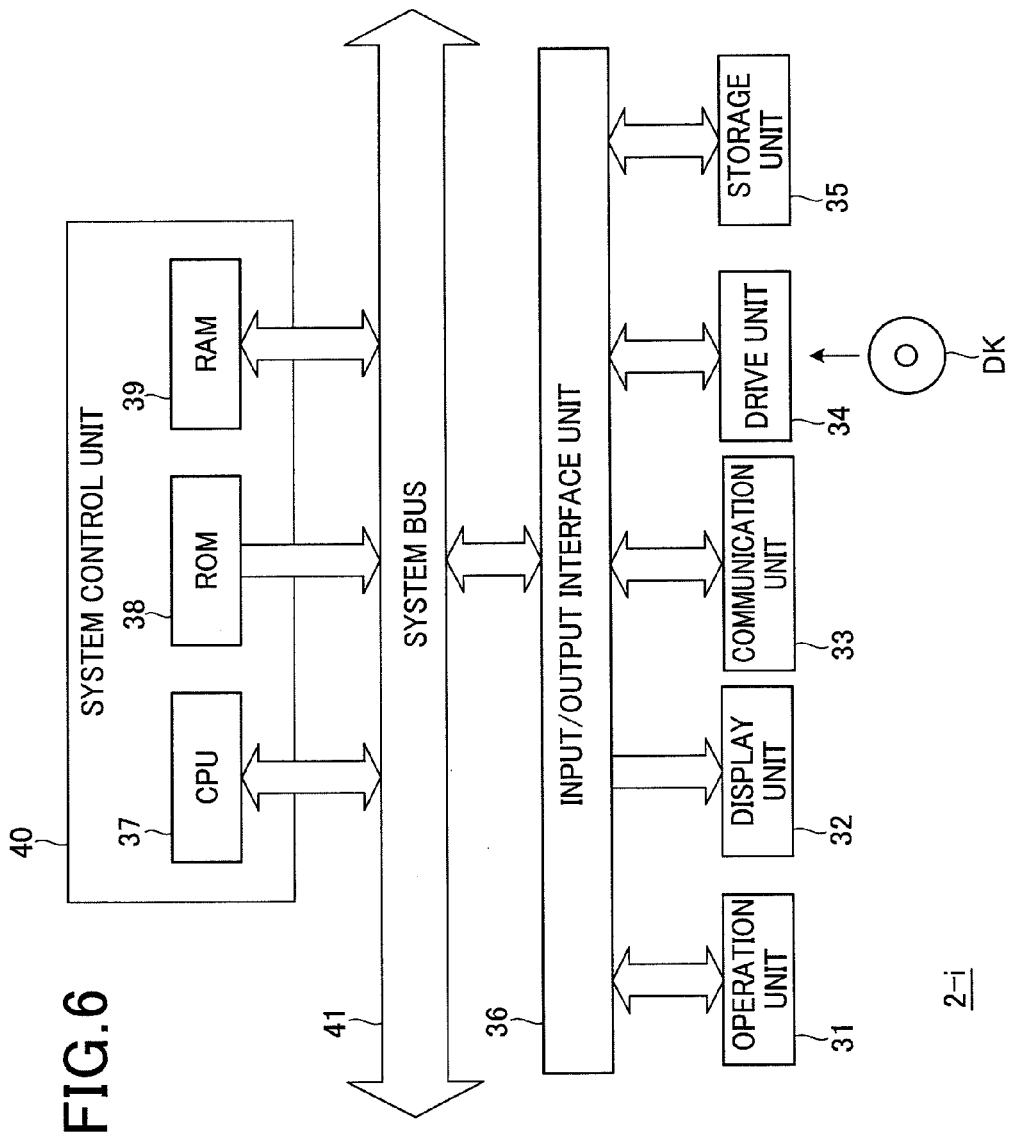
FIG. 6 is a block diagram illustrating an example of the schematic configuration of a PC terminal.
Figure 7:
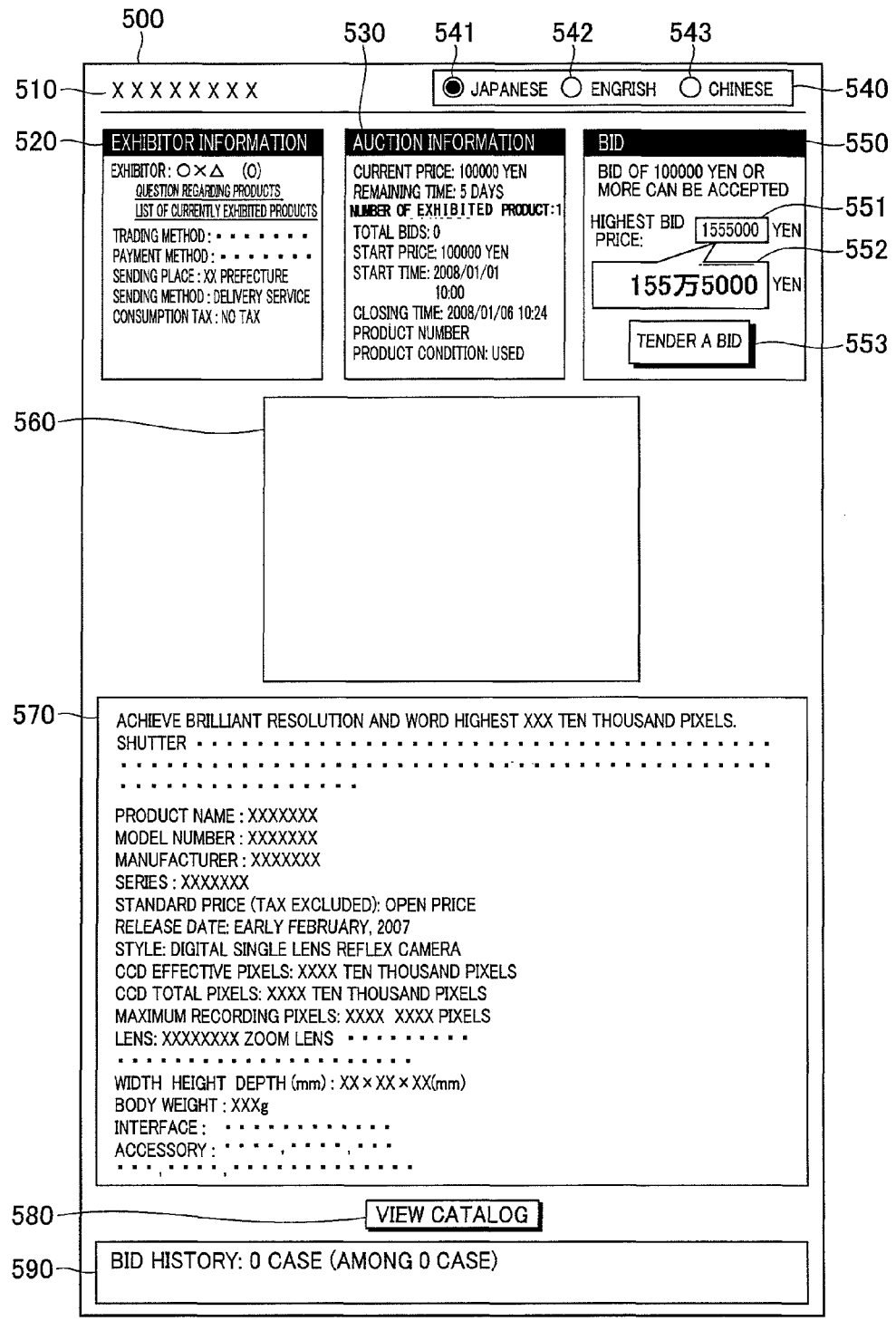
FIG. 7 is a diagram illustrating an example of a screen of a detailed page of a product that is displayed on a display unit of the PC terminal.

As illustrated in FIG. 6, similar to the auction server 1 illustrated in FIG. 2, the PC terminal 2-*i* is provided with an operation unit 31, a display unit 32, a communication unit 33, a drive unit 34, a storage unit 35, an input/output interface unit 36, and a system control unit 40. The system control unit 40 and the input/output interface unit 36 are connected to each other through a system bus 41.

The operation unit 31 is configured using a mouse, a keyboard, and so on to input a numerical value such as e.g. the bid price, and receives an operation instruction from the user and outputs instruction contents as an instruction signal to the system control unit 40.

The communication unit 33 is connected to the network NW and controls a communication state with the auction server 1 or other server apparatus and the PC terminal 2-*i*. As a matter of course, the member information DB and the auction DB are not constructed in the storage unit 35 of the PC terminal 2-*i*.

When the system control unit 40 receives the HTML data for the product detail page from the auction server 1, the system control unit 40 causes to display the product detail page on the display unit 32. As illustrated in FIG. 7, the product detail page 500 is a Web page that is read by the user to determine whether the exhibited product is bidden for. The product detail page is configured by a product name display 510, an exhibitor information display area 520, an auction information display area 530, a language selection area 540, a bid area 550, an image display area 560, a product description display area 570, a catalog reference button 580, a bid history display area 590, and so on.

In the product name display 510, a name of the exhibited product is displayed. In the exhibitor information display area 520, information (a nickname, a trading method, a payment method, and so on) about an exhibitor is displayed. In the auction information display area 530, information (a current price, a remaining time, the number of the exhibited product, the number of the bid, a start price, a start time, a closing time, and so on) about the auction of the exhibited product is displayed.

In the language selection area 540, a Japanese option button 541, an English option button 542, and a Chinese option button 543 are provided, and any option button is necessarily selected by an operation from the user. The language selection area 540 is an area to select a language used in the Web page and the system control unit 40 sets a language corresponding to the selected option button as a use language and causes to display the Web page using the set use language. Incidentally, in this embodiment, it is assumed that the Japanese option button 541 is selected, as long as a specific mention is not given.

In the bid area 550, a bid price input area 551 to input a bid price of the exhibited product and a bid button 553 to bid for the product with the input bid price are provided. In the bid area 550, an input assistance area 552 to assist the user to input the bid price (numerical value) to the bid price input area 551 is provided. When the bid price (numerical value) is input based on the operation from the user, only an Arabic numeral indicating the input bid price (numerical value) is displayed in the bid price input area 551, and a character string comprising a Chinese character indicating the digit position of the input bid price (numerical value) and an Arabic numeral indicating a value of the digit position (that is, the character string is comprising the Chinese character and the Arabic numeral), is displayed in the input assistance area 552. Incidentally, in this embodiment, as an example, only "万" and "億" are used as the Chinese characters indicating the digit position. For example, a numerical value that is represented by an Arabic numeral "5291000" is represented as "529万 1000". In this case, "万" is the Chinese character indicating the digit position, and "529" corresponds to the Arabic numeral indicating the value of the digit position. However, "千", "百", and "十" that are not used in this embodiment may be used as the Chinese character indicating the digit position. In addition, a Chinese character indicating a big numerical unit, such as "兆" and "京" where use in the auction is rare, may be used according to necessity.

Here, a display aspect of the input assistance area 552 in the case where the English option button 542 or the Chinese option button 543 is selected in the language selection area 540 will be described. If the English option button 542 is selected, when the bid price (numerical value) is input based on the operation from the user, only an Arabic numeral indicating the input bid price (numerical value) is displayed in the bid price input area 551, and a character string comprising an English word (character string) indicating the digit position of the input bid price (numerical value) and an Arabic numeral indicating a value of the digit position (the character string comprises the English word and the Arabic numeral), is displayed in the input assistance area 552. For example, "hundred", "thousand", "million", "billion", ... etc. are used as the English word (character string) indicating the digit position, and for example "10 hundred" is displayed. Incidentally, instead of "hundred", "thousand", "million", "billion", ... etc., initial characters ("H", "T", "M", and "B") thereof may be used and "10H" and "10T" may be displayed.

If the Chinese option button 543 is selected, when the bid price (numerical value) is input based on the operation from the user, only an Arabic numeral indicating the input bid price (numerical value) is displayed in the bid price input area 551, and a character string comprising a Chinese character indicating the digit position of the bid price (numerical value) input with Chinese and an Arabic numeral indicating a value of the digit position, is displayed in the input assistance area 552. For example, "百", "千", "万", "億", ... etc. are used as the Chinese character (character string) indicating the digit position. Incidentally, the script specified by the script tag described in the HTML data for the product detail page, is defined so as to cause a CPU (as a computer) to refer (confirm) to whether any option button in the language selection area 540 is selected, and to control the display of the input assistance area 552 according to the selected language.

In the image display area 560, an image of the exhibited product and so on is displayed. In the product description display area 570, a description of the exhibited product is displayed.

When the user selects the catalog reference button 580, a catalog page (not illustrated in the drawings) that displays catalog information of the exhibited product is displayed on a screen. In the bid history display area 590, a bid history until the present time is displayed.

[4. Operation of the Auction System]

Next, an operation of the auction system S will be described using FIGS. 8 and 9.

Figure 8:
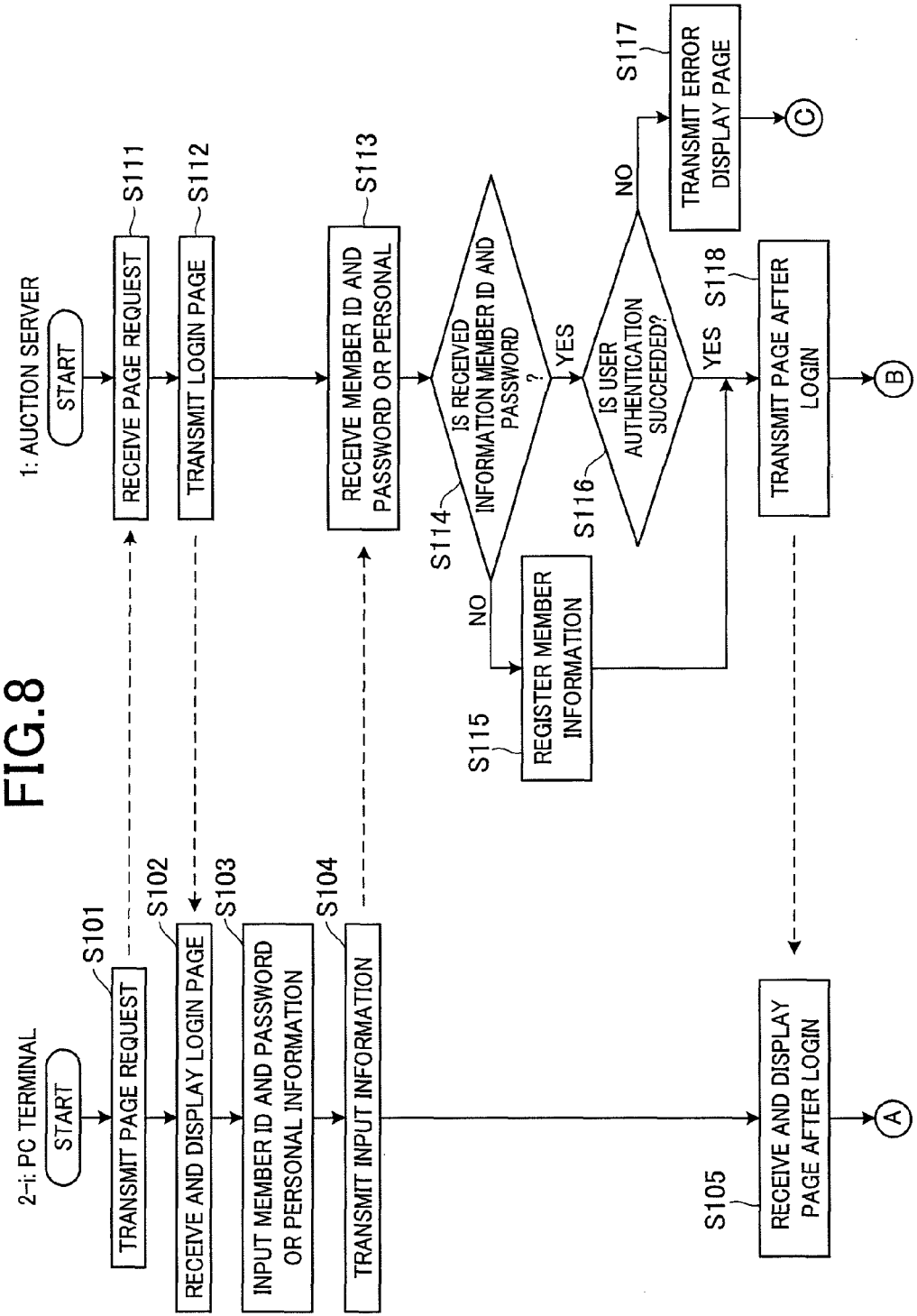
FIG. 8 is a flowchart illustrating a processing example of the auction server and the PC terminal.

As illustrated in FIG. 8, the system control unit 40 of the PC terminal 2-*i* transmits a page request by a user operation to the auction server 1 to display an auction page (not illustrated in the drawings) (step S101). When the system control unit 20 of the auction server 1 receives the page request (step S111), the system control unit 20 transmits HTML data for a login page to the PC terminal 2-*i* (step S112). When the system control unit 40 of the PC terminal 2-*i* receives the HTML data for the login page, the system control unit 40 causes to display the login page on the display unit 32 (step S102).

In this case, if the user has registered as a member, the user inputs own member ID and password (step S103). On the other hand, if the user has not registered as a member, the user inputs personal information (a password, a name, a zip code, a telephone number, an e-mail address, and so on) needed for a member registration. When the system control unit 40 of the PC terminal 2-*i* detects the input operation, the system control unit 40 transmits the input member ID and password or the input personal information to the auction server 1 (step S104).

When the system control unit 20 of the auction server 1 receives the member ID and the password or the personal information (step S113), the system control unit 20 determines whether the received information is the member ID and the password (step S114). At this time, if the received information is the personal information (No in step S114), the system control unit 20 issues a new member ID, associates the received personal information as member information with the new member ID, and registers the member information in the member information DB 101 (step S115).

Meanwhile, if the received information is the member ID and the password (Yes in step S114), the system control unit 20 executes a user authentication using the member ID and the password and determines whether the user authentication is succeeded (the user is successfully authenticated) (step S116). At this time, if the user authentication is succeeded (No in step S116), the system control unit 20 transmits HTML data for an error display page to the PC terminal 2-*i* (step S117) and ends a process in the flowchart. Incidentally, when the PC terminal 2-*i* receives the HTML data for the error display page, the PC terminal 2-*i* displays the error display page on the display unit 32.

If the member information has registered (step S115) or the user authentication is succeeded (Yes in step S116), the system control unit 20 associates the issued or received member ID with the PC terminal 2-*i* by a session management and transmits HTML data for a page after a login to the PC terminal 2-*i* (step S118). When the system control unit 40 of the PC terminal 2-*i* receives the HTML data for the page after the login, the system control unit 40 causes to display the page after the login on the display unit 32 (step S105). The page after the login is, for example, a top page of the auction site.

Then, as illustrated in FIG. 9, the system control unit 40 of the PC terminal 2-*i* transmits a product detail request to the auction server 1, in response to a product search operation or a product selection operation by the user (step S201). When the system control unit 20 of the auction server 1 receives the product detail request (step S211), the system control unit 20 transmits HTML data for the product detail page to the PC terminal 2-*i* (step S212). When the system control unit 40 of the PC terminal 2-*i* receives the HTML data for the product detail page, the system control unit 40 causes to display a product detail page 500 (refer to FIG. 7) on the display unit 32 (step S202).

Next, the system control unit 40 determines whether an operation from the user to select the bid button 553 is detected, in a state in which the product detail page 500 is displayed (step S203). At this time, if it is determined that the operation to select the bid button 553 is not detected (No in step S203), the system control unit 40 determines whether an operation from the user to input the bid price (numerical value) to the bid price input area 551 is detected (step S204).

At this time, if it is determined that the operation to input the bid price (numerical value) is not detected (No in step S204), the system control unit 40 proceeds to the process of step S203. Meanwhile, if it is determined that the operation to input the bid price (numerical value) is detected (Yes in step S204), the system control unit 40 updates the display of the bid price input area 551 and the input assistant area 552 (step S205).

Specifically, the system control unit 40 updates the display of the bid price input area 551, such that Arabic numerals are added sequentially to a digit of the lowest digit position, whenever the system control unit 40 detects the operation to input a numeral to the bid price input area 551 by executing the script specified by the script tag described in the HTML data for the product detail page. In addition to this update, the system control unit 40 updates the display of the input assistance area 552, such that the numerical value displayed with the Arabic numeral in the bid price input area 551 is represented by a character string comprising a combination of the Arabic numeral and the Chinese character ("万" or "億"). However, in this embodiment, if the number of input digits is less than 5 digits, only the Arabic numerals are displayed.

For example, in a state in which the numerical value is not input to the bid price input area 551, when the system control unit 40 detects an operation to input numerals in order of "1", "5", "5", "5", "0", "0", and "0", the system control unit 40 updates the display of the bid price input area 551 in order of "1", "15", "155", "1555", "15550", "155500", and "1555000". In addition to this update, the system control unit 40 updates the display of the input assistant area 552 in order of "1", "15", "155", "1555", "1万5550", "15万5500", and "155万5000".

Incidentally, in this embodiment, the process for converting the bid price (numerical value) input to the bid price input area 551 into the character string displayed in the input assistant area 552 and generating the character string is executed according to the script. However, the object that executes the converting/generating process is not limited to the script. For example, the system control unit 40 may execute the converting/generating process or the system control unit 20 of the auction server 1 may receive the bid price (numerical value) input to the bid price input area 551 from the PC terminal 2-*i*, execute the converting/generating process based on the bid price, and return the converting/generating process result to the PC terminal 2-*i*. If the process of step S205 ends, the system control unit 40 proceeds to the process of step S203.

If it is determined that the operation to select the bid button 553 is detected by the process of step S203 (Yes in step S203), the system control unit 40 of the PC terminal 2-*i* transmits bid price information indicating the bid price input to the bid price input area 551, to the auction server 1 (step S206). Incidentally, when the operation to select the bid button 553 is detected, in the case (i) where the bid price is not input or the case (ii) where the bid price is less than a current bid price, the system control unit 40 causes to display an error screen to urge the user to input the bid price again.

Meanwhile, when the system control unit 20 of the auction server 1 receives the bid price information from the PC terminal 2-*i* (step S213), the system control unit 20 executes the bid process based on the bid price information (step S214) and ends the process in the flowchart. The system control unit 20 updates the bid information or the exhibited product information in the auction DB 102 as the bid process.

As described above, the PC terminal 2-*i* (an example of the "input numerical value display device") according to this embodiment includes the system control unit 40 (an example of an "acquiring means") that detects the operation from the user to input the bid price (an example of a "numerical value") and acquires the input bid price, the system control unit 40 (an example of the "first display control means") that causes to display only the Arabic numeral indicating the input bid price in the bid price input area 551 (an example of a "first display area"), the system control unit 40 (an example of a "generating means") that generates numerical-value-representing-character-information indicating a character string representing the input bid price, the character string being comprising an Arabic numeral and a character or a character string other than the Arabic numeral, and the character string representing the same price as the input bid price, and the system control unit 40 (an example of a "second display control means") that causes to display the character string indicated by the numerical value character information in the input assistant area 552 (an example of a "second display area"). By the above configuration, the bid price that is input by the input operation from the user is displayed by only the Arabic numeral in the bid price input area 551 and is displayed by the character string comprising the Arabic numeral and the character or the character string other than the Arabic numeral in the input assistant area 552.

Therefore, the user who performs the input operation can intuitively understand the input bid price, not only from the display of the Arabic numeral in the bid price input area 551 but also the display of the character string comprising the Arabic numeral and the character or the character string other than the Arabic numeral in the input assistant area 552. As a result, the possibility of ignoring an erroneous input can be reduced.

When the Japanese option button 541 of the language selection area 540 has selected, if the system control unit 40 of the PC terminal 2-*i* according to this embodiment causes to display the character string comprising the Arabic numeral and the character or the character string other than the Arabic numeral in the input assistant area 552, the system control unit 40 causes to display the character string comprising the character such as "万" or "億" indicating the digit position in the input bid price and the Arabic numeral indicating the value of the digit position.

Therefore, the user can intuitively understand the input bid price from the combination of the digit position indicated by the character such as "万" or "億" and the Arabic numeral indicating the value of the digit position. For example, when the user inputs the bid price having many digits, the user can understand the input bid price based on the digit position indicated by the character such as "万" or "億". As a result, the erroneous input of digits can be prevented in advance.

When the English option button 542 or the Chinese option button 543 of the language selection area 540 has selected, the system control unit 40 (an example of a "language setting means") of the PC terminal 2-*i* according to this embodiment sets a use language according to the selected option button, converts the input bid price into the character string comprising the English word ("hundred", "thousand", "million", and "billion") or the Chinese character ("百", "千", "万", "亿" and so on) indicating any digit positions in the input bid price of the set language and the Arabic numeral indicating the value of the digit positions, generates the character string (that is, the character string comprises the English word or the Chinese character and the Arabic numeral), and causes to display the generated character string in the input assistant area 552.

Therefore, the user selects the language (for example, a native language) which can understand by himself/herself as the use language, as a result, it is possible that the digit position indicated by the character or the character string other than the Arabic numeral, is converted into the character or the character string represented by the selected language, the character or the character string is generated and displayed. Thus, the possibility of the user misunderstanding the bid price displayed in the input assistant area 552 can be reduced and the possibility of erroneously inputting the bid price can be reduced. Incidentally, in this embodiment, Japanese, English, and Chinese are applied as an example of selectable languages. However, the other languages may be included in the options of selectable languages, such that erroneous inputs from a large number of users can be prevented. Moreover, the use language may be automatically set based on an access zone (nation) of the user terminal 2-*i*. Alternatively, the use language may always be set to English, regardless of the access zone (nation) of the user terminal 2-*i*.

Incidentally, in this embodiment, the bid price that is input to the bid price input area 551 is converted into the character string comprising the Arabic numeral and the character or the character string other than the Arabic numeral, the character string is generated, and the character string is displayed in the input assistant area 552. However, only the character or only the character string other than the Arabic numeral may be displayed or another input assistant area may be provided and both the areas may be displayed.

Here, the case where only the character or only the character string other than the Arabic numeral may be displayed in the input assistant area 552 will be described. If the user selects Japanese as the use language, only Chinese numerals are displayed. For example, "15238" is represented as "一万五千二百三十八 万五千二百三十八". Incidentally, "15238" may be represented as "壱万五千弐百参拾八" using formal characters (called daiji).

Moreover, if the user selects English as the use language, only an English word is displayed. For example, "15238" is represented as "fifteen thousand two hundred and thirty-eight".

Furthermore, If the user selects Chinese as the use language, only a Chinese numeral is displayed. In a numeral expression of Chinese, formal characters (called daxie) and normal characters (called shaoxie) are used. However, the numeral may be represented by the formal characters or the normal characters. For example, "15238" may be represented as "一万五千二百三十八" using the normal characters and may be represented as "壹萬伍仟貳叄拾捌" using the formal characters. Alternatively, character strings of the plural use languages such as Japanese, English, and Chinese may be displayed together.

As the operation from the user to input the bid price (an example of a "numerical value"), an operation (for example, an operation for moving a pointer of the mouse from the bid price input area 551 or pressing any button disposed in the product detail page 500) that is triggered after the user inputs the bid price to the bid price input area 551 may be executed. In this case, after "1555000" is input to the bid price input area 551, the system control unit 40 converts "1555000", generates "155万5000", and displays "155万5000" in the input assistant area 552.

Incidentally, the auction server 1 (an example of a "server apparatus for input numerical value display") may be connected through the network NW (an example of an "an electric communication network") from the PC terminal 2-*i* (an example of the "input numerical value display device") including the system control unit 40 (an example of an "acquiring means") that detects the operation from the user to input the bid price (an example of a "numerical value") and acquires the input bid price, and the system control unit 40 (an example of the "display control means") that causes to display only the Arabic numeral indicating the input bid price in the bid price input area 551 (an example of a "first display area"). In this case, the auction server 1 includes the system control unit 20 (an example of a "receiving means") that receives price information (an example of "numerical value information") indicating the input bid price from the PC terminal 2-I, the system control unit 20 (an example of a "server generating means") that generates numerical-value-representing-character-information indicating a character or a character string, the character or the character string representing the same value as the input bid price, represented by at least any one of (i) a character string comprising an Arabic numeral and a character or a character string other than the Arabic numeral and (ii) either only a character or only a character string other than an Arabic numeral, and the system control unit 20 (an example of a "transmitting means") that transmits the numerical-value-representing-character-information to the PC terminal 2-*i*. In this configuration, also, the user who performs the input operation can intuitively understand the input bid price from the display of the Arabic numeral in the bid price input area 551 and the display of (i) the character string comprising the Arabic numeral and a character or the character string other than the Arabic numeral or the display of (ii) either only the character or only the character string other than an Arabic numeral in the input assistant area 552. As a result, the possibility of ignoring an erroneous input can be reduced.

Further, "," may be used as the character other than the Arabic numeral and if "1000000" is input, "1,000,000" may be displayed.

In this embodiment, the present invention is applied to the case where the bid price is input in the auction system S. However, the present invention may be applied to the various cases where numerical values are input. For example, the present invention may be applied to the case where a product ordering party inputs an ordering number or weight of the product to a product ordering terminal in a product ordering system in which the product ordering terminal disposed on the side of the product ordering party transmits the type of the product and the ordering number or the weight of the product to a server apparatus disposed on the side of a product provider.

A service provider may provide services such as online shopping (net shopping), accommodation reservation, and golf course reservation, in addition the auction. In the case of the online shopping, an input of a total amount (an example of a "numerical value") may be received by an operation (for example, an operation for pressing a confirmation button) executed to confirm the total amount of products in a shopping cart before the purchase, after putting the products in the shopping cart. Alternatively, in the case of the online shopping, an input of the amount of purchase (an example of a "numerical value") may be received by an operation (an operation for pressing a purchase button) executed to purchase a product. In the case of the accommodation reservation and the golf course reservation, an input of a charge (an example of a "numerical value") for a service (golf course)

may be received by an operation (for example, an operation for pressing a reservation button) executed to reserve the accommodations or the golf course.

EXPLANATION OF REFERENCE NUMERALS

1: auction server
11: auction server/operation unit
12: auction server/display unit
13: auction server/communication unit
14: auction server/drive unit
15: auction server/storage unit
16: auction server/input/output interface unit
17: auction server/CPU
18: auction server/ROM
19: auction server/RAM
20: auction server/system control unit
21: auction server/system bus
101: auction server/member information DB
102: auction server/auction DB
2-*i*: PC terminal
31: PC terminal/operation unit
32: PC terminal/display unit
33: PC terminal/communication unit
34: PC terminal/drive unit
35: PC terminal/storage unit
36: PC terminal/input/output interface unit
37: PC terminal/CPU
38: PC terminal/ROM
39: PC terminal/RAM
40: PC terminal/system control unit
41: PC terminal/system bus
NW: network
S: auction system

The invention claimed is:

1. An input numerical value display device, including at least one processor, comprising:
at least one memory operable to store program code;
at least one processor operable to access said memory and read said program code and operate as instructed by said program code, said program code including:
acquiring code configured to cause at least one of said at least one processor to receive an input of a numerical value and acquires the input numerical value whenever one digit of the numerical value is input;
first display control code configured to cause at least one of said at least one processor to display an Arabic numeral representing the input numerical value in a first display area and to update the first display area each time a single digit of the numerical value is input;
generating code configured to cause at least one of said at least one processor to generate only numerical-value-representing-character-information representing the same value as the input numerical value, represented by any one of (i) the character string comprising an Arabic numeral and either the character or the character string other than the Arabic numeral representing the input numerical value and (ii) either only the character or only the character string other than an Arabic numeral representing the input numerical value, based on numerical value information of the input numerical value each time a single digit of the numerical value is input;
second display control code configured to cause at least one of said at least one processor to update display contents on a second display area displaying either the character or the character string represented by the numerical-value-representing-character-information each time a single digit of the numerical value is input; and
language setting code configured to cause at least one of said at least one processor to detect a use language of a user and set the use language as a language used by the generating code for generating of the numerical-value-representing-character-information.

2. The input numerical value display device according to claim 1, wherein,
when the generating code causes at least one of said at least one processor generate the numerical-value-representing-character-information indicating the character string comprising the Arabic numeral and either the character or the character string other than the Arabic numeral representing the input numerical value,
the generating code id further configured to cause at least one of said at least one processor to generate the numerical-value-representing-character-information indicating the character string comprising the Arabic numeral indicating a value of at least any digit position in the input numerical value and either the character or the character string other than the Arabic numeral representing the input numerical value, said either the character or the character string other than the Arabic numeral indicating the digit position in the input numerical value, based on the numerical value information of the input numerical value.

3. The input numerical value display device according to claim 2,
wherein the generating code is further configured to cause at least one of said at least one processor to use either the character or the character string indicating the digit position by the set use language as either the character or the character string indicating the digit position.

4. The input numerical value display device according to claim 3, wherein,
when Japanese is set as the use language, the generating code is further configured to cause at least one of said at least one processor to use a Chinese character indicating the digit position as either the character or the character string indicating the digit position.

5. The input numerical value display device according to claim 1, wherein,
when the generating code causes at least one of said at least one processor to generate the numerical-value-representing-character-information indicating the either character or the character string represented by either only the character or only the character string other than an Arabic numeral representing the input numerical value,
the generating code is further configured to cause at least one of said at least one processor to generate the numerical-value-representing-character-information indicating either the character or the character string represented by either only the character or only the character string other than an Arabic numeral, said either the character or the character string other than an Arabic numeral representing the input numerical value, indicating the input numerical value by the set use language, based on the numerical value information of the input numerical value.

6. The input numerical value display device according to claim 5, wherein,
when Japanese is set as the use language, the generating code is further configured to cause at least one of said at least one processor to use either the character or the character string represented by a Chinese character as either the character or the character string indicating the input numerical value.

7. The input numerical value display device according to claim 1,
wherein the numerical value indicates at least one of a price, number, and weight of a product.

8. The input numerical value display device according to claim 1,
wherein the acquiring code is fu her configured to cause at least one of said at least one processor to, by detecting an operation to input the numerical value from the user, receive the input of the numerical value, and acquires the received numerical value.

9. A server apparatus, including at least one processor, for input numerical value display, that is connected to an input numerical value display device through an electric communication network, the server apparatus causing the input numerical value display device:
to receive, using the at least one processor, an input of a numerical value and acquire the input numerical value whenever one digit of the numerical value is input;
to display an Arabic numeral representing the input numerical value in a first display area and to update the first display area each time a single digit of the numerical value is input;
to generate, using the at least one processor, only numerical-value-representing-character-information representing the same value as the input numerical value, represented by any one of (i) the character string comprising an Arabic numeral and either the character or the character string other than the Arabic numeral representing the input numerical value and (ii) either only the character or only the character string other than an Arabic numeral representing the input numerical value, based on numerical value information of the input numerical value each time a single digit of the numerical value is input;
to update, using the at least one processor, display contents on a second display area displaying the character or the character string represented by the numerical-value-representing-character-information each time a single digit of the numerical value is input; and
to detect, using the at least one processor, a use language of a user and set the use language as a language used for generating of the numerical-value-representing-character-information.

10. A server apparatus, including at least one processor, for input numerical value display, that is connected to an input numerical value display device through an electric communication network, the input numerical value display device receiving an input of a numerical value and acquiring the input numerical value, the server apparatus comprising:
at least one memory operable to store program code;
at least one processor operable to access said memory and read said program code and operate as instructed by said program code, said program code including:
receiving code configured to cause at least one of said at least one processor to receive numerical value information indicating the numerical value acquired by the input numerical value display device each time a single digit of the numerical value is input, from the input numerical value display device;
server generating code configured to cause at least one of said at least one processor to generate only numerical-value-representing-character-information representing the same value as the input numerical value, represented by any one of (i) the character string comprising an Arabic numeral and either the character or the character string other than the Arabic numeral representing the input numerical value and (ii) either only the character or only the character string other than an Arabic numeral representing the input numerical value, based on the numerical value indicated by the numerical value information each time a single digit of the numerical value is input;
transmitting code configured to cause at least one of said at least one processor to transmit the numerical-value-representing-character-information to the input numerical value display device, such that either the character or the character string represented by the numerical-value-representing-character-information is displayed by the input numerical value display device each time a single digit of the numerical value is input; and
language setting code configured to cause at least one of said at least one processor to detect a use language of a user and set the use language as a language used by the server generating code for generating of the numerical-value-representing-character-information.

11. An input numerical value display method, comprising:
causing a computer to acquire an input numerical value whenever one digit of the numerical value is input;
causing the computer to display an Arabic numeral representing the input numerical value in a first display area and to update the first display area each time a single digit of the numerical value is input;
causing the computer to generate only numerical-value-representing-character-information representing the same value as the input numerical value, represented by at least any one of (i) the character string comprising an Arabic numeral and either the character or the character string other than the Arabic numeral representing the input numerical value and (ii) either only the character or only the character string other than an Arabic numeral representing the input numerical value, based on numerical value information of the input numerical value each time a single digit of the numerical value is input;
causing the computer to update display contents on a second display area displaying either the character or the character string represented by the numerical-value-representing-character-information each time a single digit of the numerical value is input; and
causing the computer to detect a use language of a user and set the use language as a language used for generating of the numerical-value-representing-character-information.

12. A non-transitory recording medium which records an input numerical value display program, the input numerical value display program causing a computer to:
receive an input of a numerical value and acquires the input numerical value whenever one digit of the numerical value is input;
display an Arabic numeral representing the input numerical value in a first display area and update the first display area each time a single digit of the numerical value is input;
generate only numerical-value-representing-character-information representing the same value as the input numerical value, represented by any one of (i) the character string comprising an Arabic numeral and either the character or the character string other than the Arabic numeral representing the input numerical value and (ii) either only the character or only the character string other than an Arabic numeral, based on numerical value information of the input numerical value each time a single digit of the numerical value is input;

update display contents on a second display area displaying either the character or the character string represented by the numerical-value-representing-character-information each time a single digit of the numerical value is input; and detect a use language of a user and set the use language as a language for generating of the numerical-value-representing-character-information.

13. The input numerical value display device according to claim 1, wherein the first display control code is further configured to cause at least one of said at least one processor to update the input numerical value in a first display area whenever the acquiring code causes at least one of said at least one processor to detect an operation to input the numerical value by executing a script specified; and the second display control code configured to cause at least one of said at least one processor to update the character or the character string in a second display area whenever the first display control code causes at least one of said at least one processor to update the input numerical value in the first display area.

* * * * *